US 8,279,304 B2

(12) United States Patent  (10) Patent No.: US 8,279,304 B2
Tanaka  (45) Date of Patent: Oct. 2, 2012

(54) PHOTOGRAPHY APPARATUS THAT SELECTS OPTIMAL PHOTOGRAPHY METHODS AND OBTAINS DYNAMIC RANGE EXPANDED IMAGES BASED ON IMAGES OBTAINED BY PHOTOGRAPHY (75) Inventor: Seiji Tanaka, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 273 days.

(21) Appl. No.: 12/560,882

(22) Filed: Sep. 16, 2009

(65) Prior Publication Data
US 2010/0073513 A1  Mar. 25, 2010

(30) Foreign Application Priority Data
Sep. 19, 2008 (JP) ................................. 2008-240880

(51) Int. Cl.
H04N 5/235 (2006.01)
H04N 5/228 (2006.01)
G06K 9/40 (2006.01)
(52) U.S. Cl. ................ 348/229.1; 348/221.1; 348/222.1; 348/362; 348/230.1; 382/274
(58) Field of Classification Search ............... 348/229.1, 348/230.1, 222.1, 362, 255, 687, 221.1, 364; 382/274
See application file for complete search history.

(56) References Cited

U.S. PATENT DOCUMENTS
6,529,640 B1  3/2003 Utagawa et al.
6,813,046 B1 * 11/2004 Gindele et al. ................ 358/505
2004/0169751 A1  9/2004 Takemura et al.
2005/0270412 A1 * 12/2005 Kamon et al. ................ 348/362
2006/0239582 A1  10/2006 Hyoudou
2009/0009632 A1 *  1/2009 Hyodo et al. ................ 348/234
2010/0073529 A1 *  3/2010 Uchida .......................... 348/262

FOREIGN PATENT DOCUMENTS
JP  11-155098 A  6/1999
JP  2003-179819 A  6/2003
JP  2003-264738 A  9/2003

OTHER PUBLICATIONS
Japanese Office Action issued in Japanese Application No. 2008-240880 dated Jan. 24, 2012 (3 pages).
Extended European Search Report issued in European Application No. 01970375.1 dated May 25, 2012.

* cited by examiner

Primary Examiner — Lin Ye
Assistant Examiner — Marly Camargo
(74) Attorney, Agent, or Firm — Sughrue Mion, PLLC (57) ABSTRACT A plurality of photography operations are performed with respect to a single subject with different photography conditions, to obtain a plurality of image data sets. The obtained image data are processed to obtain a single dynamic range expanded image data set. A photography method is selected from among: a first method, in which photography is performed at least twice at different exposures; a second method, in which photography is performed with an underexposure at a step number based on a set dynamic range; and a third method, in which photography is performed at least twice with different underexposures at step numbers based on a set dynamic range, based on whether photography operations are possible at exposure ratios corresponding to the expansion ratio of the dynamic range and whether flash is emitted. Photography is performed according to the selected method, thereby preventing limitations of dynamic range due to hardware specifications.

10 Claims, 6 Drawing Sheets

FIRST PHOTOGRAPHY METHOD

FIG.2A

A SIDE (EXPOSURE: 1)     B SIDE (EXPOSURE: 1/4)

FIG.2B

A SIDE     B SIDE (4x GAIN)

FIG.2C

A SIDE + B SIDE

SECOND PHOTOGRAPHY METHOD

4x GAIN

THIRD PHOTOGRAPHY METHOD

FIG.4A

A SIDE (EXPOSURE: 1/2)     B SIDE (EXPOSURE: 1/8)

FIG.4B

A SIDE (2x GAIN)     B SIDE (8x GAIN)

FIG.4C

A SIDE + B SIDE

PHOTOGRAPHY APPARATUS THAT SELECTS OPTIMAL PHOTOGRAPHY METHODS AND OBTAINS DYNAMIC RANGE EXPANDED IMAGES BASED ON IMAGES OBTAINED BY PHOTOGRAPHY

BACKGROUND OF THE INVENTION

1. Field of the Invention

The present invention is related to a photography apparatus and a photography method that employs an imaging element such as a CCD to obtain image data sets having wide dynamic ranges.

2. Description of the Related Art

CCD's, which are imaging means employed in digital cameras, have narrower dynamic ranges than silver salt film. Therefore, overexposure and underexposure are likely to occur in images photographed by digital cameras. For this reason, there are known techniques for obtaining image data sets having expanded dynamic ranges that exhibit favorably reproduction properties over a wide range from high brightness to low brightness. In these techniques, imaging is performed with different exposure conditions to obtain an image having a large amount of data toward the high brightness side, and an image having a large amount of data toward the low brightness side, for example, and then the images are combined to obtain an expanded dynamic range image data set.

As an example of a technique for obtaining a plurality of image data sets with different exposure conditions, there is a method that utilizes a CCD, in which main pixels having high sensitivity and sub pixels of smaller areas than the main pixels and therefore have lower sensitivity but are less likely to be saturated are arranged, to change the exposure conditions for each image, as disclosed in Japanese Unexamined Patent Publication No. 2003-179819. Another example of such a technique is a method in which photography is performed employing different shutter speeds, to change the exposure conditions for each image, as disclosed in Japanese Unexamined Patent Publication No. 11 (1999)-155098.

Generally, in the case that the aforementioned techniques are employed to obtain a dynamic range expanded image data set having a dynamic range which is expanded n times that of an image obtained by standard photography, an image data set, which is photographed with the same amount of exposure as that during standard photography, and an image data set, which is photographed with an exposure amount 1/n times that during standard photography, are required. In the case that the dynamic range is to be expanded to 800% (8 times), for example, an image data set, which is photographed with the same amount of exposure as that during standard photography, and an image data set, which is photographed with an exposure amount ⅛ that during standard photography, are required. That is, it is necessary to decrease the exposure amount compared to that during standard photography, in order to greatly expand the dynamic range.

However, in the technique disclosed in Japanese Unexamined Patent Publication No. 2003-179819, the CCD having the main pixels and the sub pixels, which have different sensitivities, are used to perform photography to obtain two images at a certain exposure ratio. Therefore, the exposure ratio is uniquely determined by the sensitivity ratio between the main pixels and the sub pixels. Accordingly, the expansion rate of the dynamic range cannot be set freely.

In the technique disclosed in Japanese Unexamined Patent Publication No. 11 (1999)-155098, it is not possible to reduce the amount of exposure to a degree that exceeds the limit of possible shutter speeds. Therefore, there is a limit to the expansion rate of the dynamic range.

SUMMARY OF THE INVENTION

The present invention has been developed in view of the foregoing circumstances. It is an object of the present invention to provide a photography apparatus and a photography method that performs a plurality of photography operations under different photography conditions with respect to a single subject to obtain a plurality of image data sets corresponding to each photography operation, then processes the image data sets to obtain a single dynamic range expanded image data set, in which the dynamic range is not limited by hardware specifications.

A photography apparatus of the present invention comprises:

imaging means for performing a plurality of photography operations having different photography conditions for a single subject, and obtaining a plurality of image data sets corresponding to the plurality of photography operations;

image data processing means, for processing at least one set of image data from among the plurality of sets of image data to obtain a dynamic range expanded image data set;

dynamic range setting means, for setting the dynamic range of the dynamic range expanded image data set;

photography method selecting means, for selecting a photography method from among a plurality of photography methods, in which the operations of the imaging means and the image data processing means are defined, most suited for obtaining a dynamic range expanded image data set at the dynamic range set by the dynamic range setting means; and photography means, for performing photography operations according to the photography method selected by the photography method selecting means.

Here, the method by which the photography method selecting means selects a favorable photography method is not particularly limited. An example of such a method is that in which the photography method most suited for obtaining the dynamic range expanded image is determined, based on recognition of the subject and/or the subject field.

It is preferable for a configuration to be adopted, in which the photography apparatus of the present invention further comprises:

exposure ratio determining means, for determining the exposure ratios among each photography operation based on the dynamic range set by the dynamic range setting means; and first judging means for judging whether photography operations employing the exposure ratios determined by the exposure ratio determining means are capable of being performed by the imaging means; and wherein:

the photography method selecting means selects the photography method suited for obtaining the dynamic range expanded image data set based on the judgment results of the first judging means.

In this case, the photography apparatus of the present invention may further comprise:

photometry means, for measuring the photometric values of the subject; and second judging means, for judging whether flash is to be emitted toward the subjects, based on the results of measurement of the photometric values by the photometry means; wherein the plurality of photography methods include:

a first photography method, in which the imaging means performs at least two photography operations with different exposures and the image data processing means processes the image data sets obtained by the photography operations to obtain a single dynamic range expanded image data set;

a second photography method, in which the imaging means performs a photography operation with an underexposure at a step number based on the value of the dynamic range set by the dynamic range setting means and the image data processing means processes the image data set obtained by the photography operation to obtain a single dynamic range expanded image data set; and a third photography method, in which the imaging means performs at least two photography operations with different underexposures at step numbers based on the value of the dynamic range set by the dynamic range setting means and the image data processing means processes the at least two image data sets obtained by the photography operations to obtain a single dynamic range expanded image data set; and wherein:

the photography method selecting means selects the first photography method in the case that the result of judgment by the first judging means is affirmative and the second judging means judges that flash is not to be emitted, selects the second photography method in the case that the result of judgment by the first judging means is affirmative and the second judging means judges that flash is to be emitted, and selects the third photography method in the case that the result of judgment by the first judging means is negative.

Alternatively, a configuration may be adopted, wherein:

the imaging means is equipped with a great number of first light receiving elements and second light receiving elements that photoelectrically convert light from subjects, which are capable of being controlled so as to be driven independently from each other and are arranged in a predetermined arrangement, and which have different exposure properties that generate exposure differences between the first light receiving elements and the second light receiving elements;

the plurality of photography methods include: a first photography method, in which the imaging means performs at least two photography operations with different exposures and the image data processing means processes the image data sets obtained by the photography operations to obtain a single dynamic range expanded image data set; and a third photography method, in which the imaging means performs at least two photography operations with different underexposures at step numbers based on the value of the dynamic range set by the dynamic range setting means and the image data processing means processes the at least two image data sets obtained by the photography operations to obtain a single dynamic range expanded image data set; and the photography method selecting means selects the first photography method in the case that the result of judgment by the first judging means is affirmative, and selects the third photography method in the case that the result of judgment by the first judging means is negative.

As a further alternative, a configuration may be adopted, wherein:

the imaging means is capable of performing photography operations with different shutter speeds for each of the photography operations, to generate exposure differences for each photography operation;

the plurality of photography methods include: a first photography method, in which the imaging means performs at least two photography operations with different exposures and the image data processing means processes the image data sets obtained by the photography operations to obtain a single dynamic range expanded image data set; and a third photography method, in which the imaging means performs at least two photography operations with different underexposures at step numbers based on the value of the dynamic range set by the dynamic range setting means and the image data processing means processes the at least two image data sets obtained by the photography operations to obtain a single dynamic range expanded image data set; and the photography method selecting means selects the first photography method in the case that the result of judgment by the first judging means is affirmative, and selects the third photography method in the case that the result of judgment by the first judging means is negative.

A photography method of the present invention comprises the steps of:

employing an imaging means to perform a plurality of photography operations having different photography conditions for a single subject, and obtaining a plurality of image data sets corresponding to the plurality of photography operations;

processing at least one set of image data from among the obtained plurality of sets of image data to obtain a dynamic range expanded image data set;

setting the dynamic range of the dynamic range expanded image data set;

selecting a photography method from among a plurality of photography methods, in which the operations of the imaging means and the image data processing means are defined, most suited for obtaining a dynamic range expanded image data set at the set dynamic range; and performing a photography operation according to the selected photography method.

Here, the method by which a favorable photography method is selected is not particularly limited. An example of such a method is that in which the photography method most suited for obtaining the dynamic range expanded image is determined, based on recognition of the subject and/or the subject field.

It is preferable for the photography method of the present invention to further comprise the steps of:

determining the exposure ratios among each photography operation based on the set dynamic range; and judging whether photography operations employing the determined exposure ratios are capable of being performed by the imaging means; and wherein:

the photography method suited for obtaining the dynamic range expanded image data set is selected based on the judgment results of the judgment.

In this case, the plurality of photography methods may include:

a first photography method, in which the imaging means performs at least two photography operations with different exposures and the image data sets obtained by the photography operations are processed to obtain a single dynamic range expanded image data set;

a second photography method, in which the imaging means performs a photography operation with an underexposure at a step number based on the value of the dynamic range set by the dynamic range setting means and the image data set obtained by the photography operation is processed to obtain a single dynamic range expanded image data set; and a third photography method, in which the imaging means performs at least two photography operations with different underexposures at step numbers based on the set value of the dynamic range and the at least two image data sets obtained by the photography operations are processed to obtain a single dynamic range expanded image data set; and the first photography method may be selected in the case that it is judged that the imaging means is capable of performing a photography operation employing the determined exposure ratio and it is judged that flash is not to be emitted, the second photography method may be selected in the case that it is judged that the imaging means is capable of performing a photography operation employing the determined exposure ratio and it is judged that flash is to be emitted, and the third photography method may be selected in the case that it is judged that the imaging means is not capable of performing a photography operation employing the determined exposure ratio.

Alternatively, a configuration may be adopted, wherein:

the imaging means is equipped with a great number of first light receiving elements and second light receiving elements that photoelectrically convert light from subjects, which are capable of being controlled so as to be driven independently from each other and are arranged in a predetermined arrangement, and which have different exposure properties that generate exposure differences between the first light receiving elements and the second light receiving elements;

the plurality of photography methods include: a first photography method, in which the imaging means performs at least two photography operations with different exposures and the image data sets obtained by the photography operations are processed to obtain a single dynamic range expanded image data set; and a third photography method, in which the imaging means performs at least two photography operations with different underexposures at step numbers based on the set value of the dynamic range and the at least two image data sets obtained by the photography operations are processed to obtain a single dynamic range expanded image data set; and the first photography method is selected in the case that it is judged that the imaging means is capable of performing a photography operation employing the determined exposure ratio, and the third photography method is selected in the case that it is judged that the imaging means is not capable of performing a photography operation employing the determined exposure ratio.

As a further alternative, a configuration may be adopted, wherein:

the imaging means is capable of performing photography operations with different shutter speeds for each of the photography operations, to generate exposure differences for each photography operation;

the plurality of photography methods include: a first photography method, in which the imaging means performs at least two photography operations with different exposures and the image data sets obtained by the photography operations are processed to obtain a single dynamic range expanded image data set; and a third photography method, in which the imaging means performs at least two photography operations with different underexposures at step numbers based on the set value of the dynamic range and the at least two image data sets obtained by the photography operations are processed to obtain a single dynamic range expanded image data set; and the first photography method is selected in the case that it is judged that the imaging means is capable of performing a photography operation employing the determined exposure ratio, and the third photography method is selected in the case that it is judged that the imaging means is not capable of performing a photography operation employing the determined exposure ratio.

The photography apparatus and the photography method of the present invention perform a plurality of photography operations having different photography conditions for a single subject, to obtain a plurality of image data sets corresponding to the plurality of photography operations; process at least one set of image data from among the obtained plurality of sets of image data to obtain a dynamic range expanded image data set; set the dynamic range of the dynamic range expanded image data set; select a photography method from among a plurality of photography methods, in which the operations of the imaging means and the contents of image data processes are defined, most suited for obtaining a dynamic range expanded image data set at the set dynamic range; and perform a photography operation according to the selected photography method. Therefore, it becomes possible to select a favorable photography method to perform photography regardless of the limitations of hardware specifications to obtain dynamic range expanded image data sets.

Here, the exposure ratios among each photography operation may be determined based on the set dynamic range; and whether photography operations employing the determined exposure ratios are capable of being performed by the imaging means may be judged. Thereafter, the photography method suited for obtaining the dynamic range expanded image data set may be selected based on the judgment results of the judgment. In this case, more appropriate processes can be administered.

DESCRIPTION OF THE PREFERRED EMBODIMENTS

Figure 1:
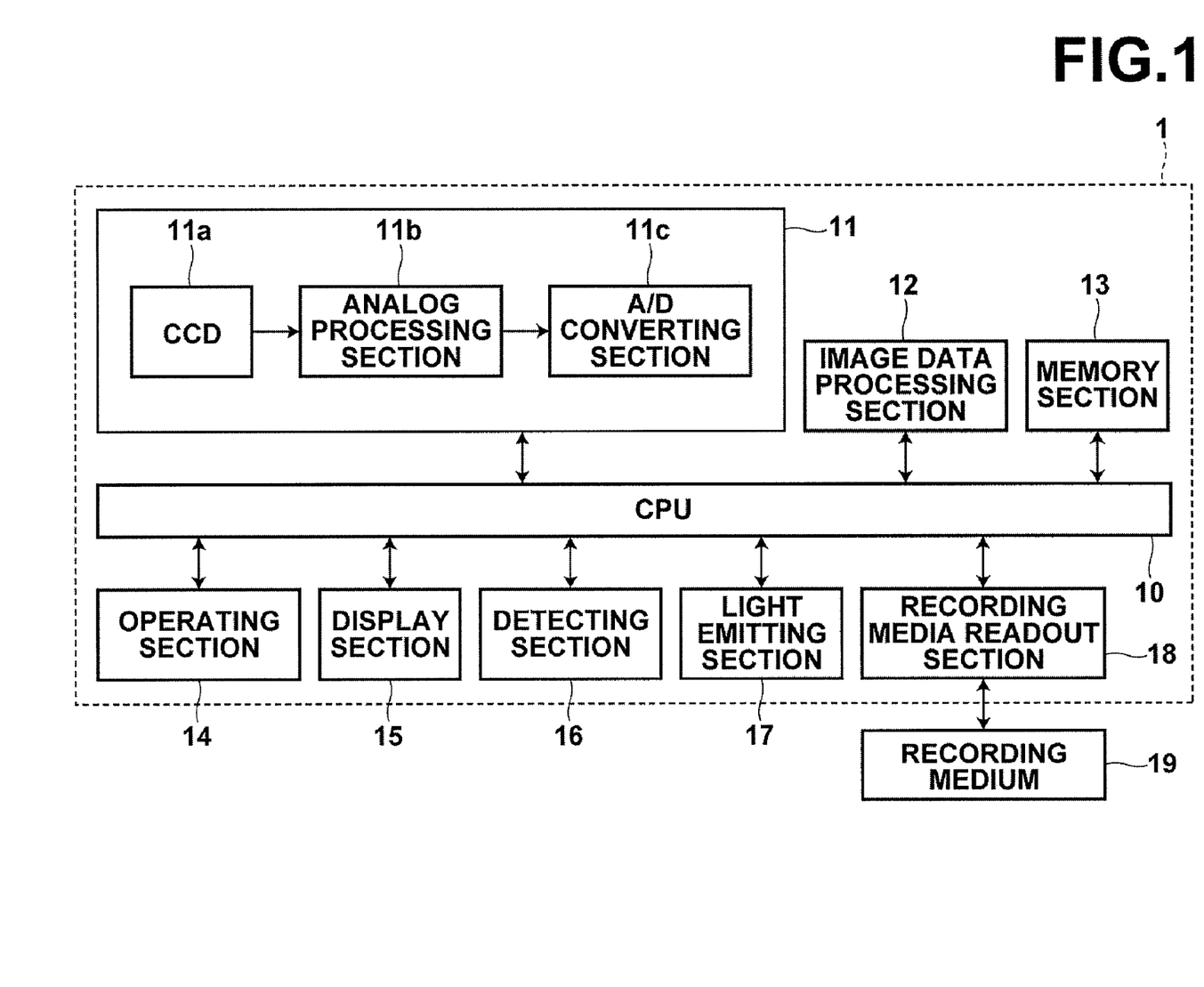
FIG. 1 is a schematic block diagram that illustrates the construction of a digital camera, to which a photography apparatus according to a first embodiment of the present invention is applied.

Hereinafter, embodiments of the present invention will be described with reference to the attached drawings. FIG. 1 is a schematic block diagram that illustrates the construction of a digital camera 1, to which a photography apparatus according to a first embodiment of the present invention is applied.

As illustrated in FIG. 1, the digital camera 1 of the first embodiment is constituted by: a CPU 10; an imaging section 11; an image signal processing section 12; a memory section 13; an operating section 14; a display section 15; a detecting section 16; a light emitting section 17; and a recording media readout section 18.

The imaging section 11 is configured to perform a plurality of photography operations with different photography conditions with respect to the same subject, and to obtain a plurality of image data sets corresponding to each of the photography operations. The imaging section 11 is equipped with: a lens group (not shown); a lens driving section (not shown); a CCD 11a that functions as an imaging element; a CCD driving section (not shown); an analog processing section 11b and an A/C converting section 11c.

Note that the plurality of image data sets of the same subject may be obtained by performing the plurality of photography operations with different photography conditions according to any of the following methods. 1) The plurality of image data sets are obtained by performing photography operations employing a CCD constituted by a great number of first light receiving elements and second light receiving elements that photoelectrically convert light from subjects, which are capable of being controlled so as to be driven independently from each other and are arranged in a predetermined arrangement. 2) The plurality of image data sets are obtained by performing high speed continuous photography using a standard CCD. 3) The plurality of image data sets are obtained by multi frame photography.

The image of the subject which is focused onto the light receiving surface of the CCD 11a is converted into signal charges of intensities corresponding to the intensity of light which is incident on each sensor of the CCD 11a. Note that the CCD has a so called electronic shutter function, by which the amount of charge accumulating time (shutter speed) of each of the sensors is controlled by the timings of shutter gate pulses.

The signal charges which are accumulated in each sensor are sequentially read out from the CCD 11a as voltage signals (analog image signals) corresponding to the signal charges, based on pulses which are output from the CCD driving section. The analog image signals which are output from the CCD 11a are sent to the analog processing section 11b.

The analog processing section 11b includes signal processing circuits such as: a sampling hold circuit; a color separating circuit; and a gain adjusting circuit. The analog processing section 11b administers a correlated double sampling (CDS) process, a color separation process to separate the analog image signals into R, G, and B color signals, and adjustment of the signal levels of each color signal (preliminary white balance process).

The signals output from the analog processing section 11b are converted into digital signals by the A/D converting section 11c, then transmitted to the image data processing section 12. Note that the CCD driving section, the analog processing section 11b and the A/D converting section 11c are synchronized by timing signals output from a timing generator according to commands from the CPU 10.

The image data processing section 12 is constituted by a digital signal processor (DSP) that includes image quality adjusting circuits, such as: a brightness/color difference signal generating circuit; a gamma correcting circuit; a sharpness adjusting circuit; a contrast correcting circuit; and a white balance adjusting circuit, as well as an image combining circuit (image data processing means) for processing at least one of the image data sets from among the plurality of image data sets obtained by photographing the same subject, to obtain a single dynamic range expanded image data set. The image data processing section 12 processes image signals based on commands output from the CPU 10.

The memory section 13 is constituted by a semiconductor memory or the like, and is capable of storing various types of data. The memory section has stored therein a system program for operating the digital camera and the like.

The operating section 14 is constituted by buttons for performing operations and settings, such as a shutter release button 33.

The display section 15 is constituted by a monitor, such as a liquid crystal display and an organic EL display.

The detecting section 16 is constituted by various sensors for detecting subject data and subject field data.

The light emitting section 17 emits flash, and is constituted by a xenon lamp or the like.

The recording media readout section 18 is equipped with an opening (media slot) into which recording media 19 are loaded. When a recording medium 19 is loaded into the media slot, data is read out from and written into the recording medium 19.

Note that the recording media 19 may be an xD Picture Card™, a Smart Media™, a PC card, a Compact Flash™, a magnetic disc, an optical disc, an magnetic optical disc, a Memory Stick™ or the like. Various types of media, from which data can be read out and into which data can be written electronically, magnetically, optically, or by combinations of these methods, can be employed. A signal processing means and an interface corresponding to the type of media which is utilized is applied.

The CPU 10 controls the entirety of the digital camera 1, based on input from the operating section 14. The CPU 10 functions as a readout control means for reading out data stored in the memory section 13 and the recording media 19 according to commands input from the operating section 14. The CPU 10 also functions as an operation control means for controlling zooming operations of the lens driving section, focusing adjustment operations (AF), and automatic exposure adjustment operations (AE). Further, the CPU 10 functions as a display control section for controlling display by the display section 15.

Still further, the CPU functions as: a judging means, for judging whether flash is to be emitted toward the subject, based on subject data and subject field data detected by the detecting section 16; a dynamic range setting means, for setting the degree of expansion of the dynamic range of obtained image data sets, based on subject data and subject field data detected by the detecting section 16; an exposure ratio determining means, for determining the exposure ratios among each photography operation, based on the dynamic range set by the dynamic range setting means; a judging means for judging whether photography operations employing the exposure ratios determined by the exposure ratio determining means are capable of being performed by the imaging means 11; a photography method selecting means, for selecting a favorable photography method from among a plurality of photography methods, in which the operations of the imaging means 11 and the image data processing means 12 are defined, based on the result of judgment by the judging means; and as a photography means, for performing photography operations according to the photography method selected by the photography method selecting means.

Figure 2A:
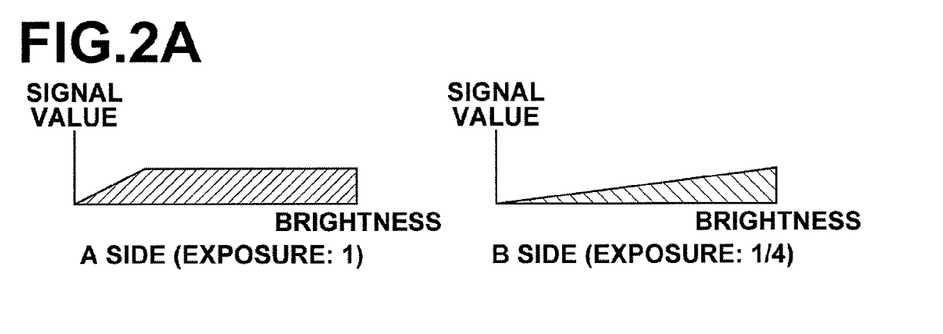
FIGS. 2A, 2B, and 2C are diagrams for explaining how data is processed according to a first photography method.
Figure 2B:
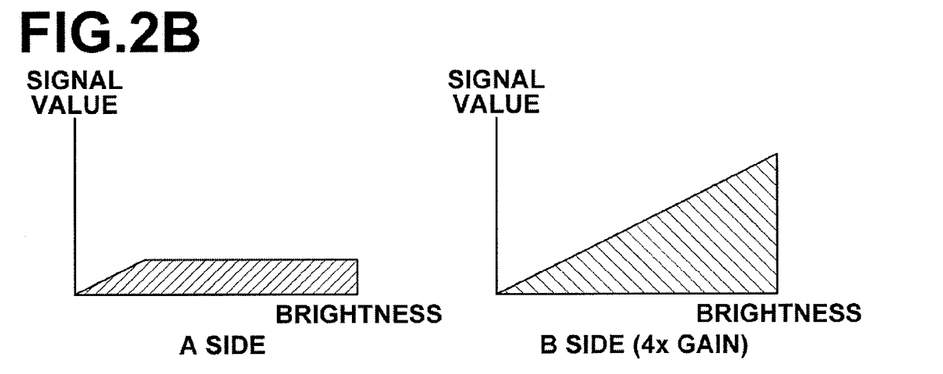
Figure 2C:
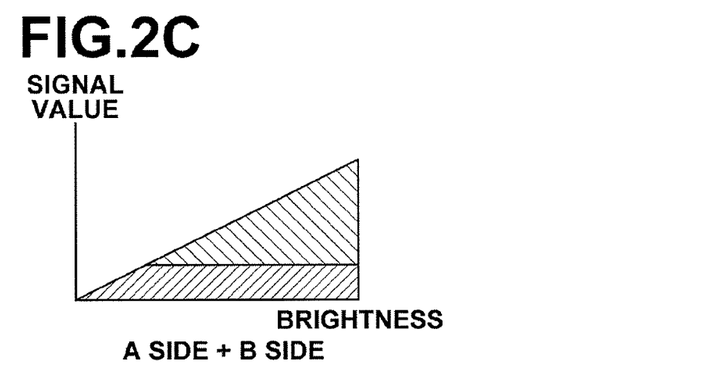
Figure 3A:
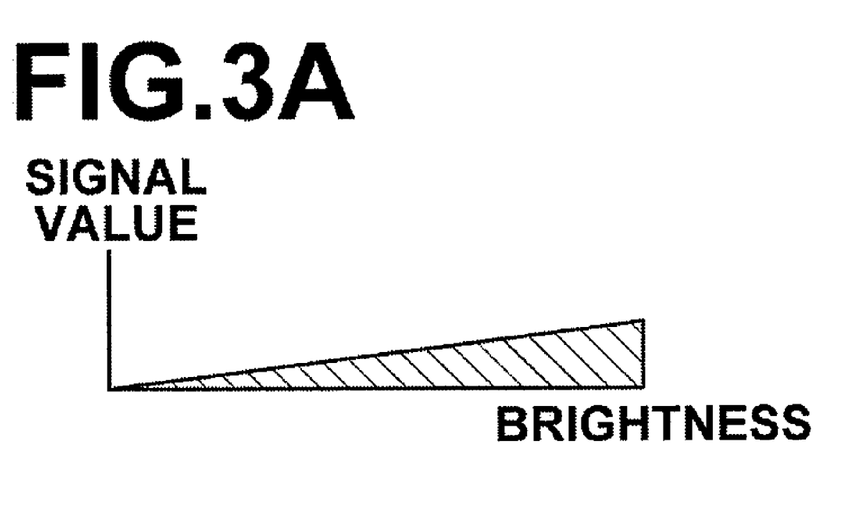
FIGS. 3A and 3B are diagrams for explaining how data is processed according to a second photography method.
Figure 3B:
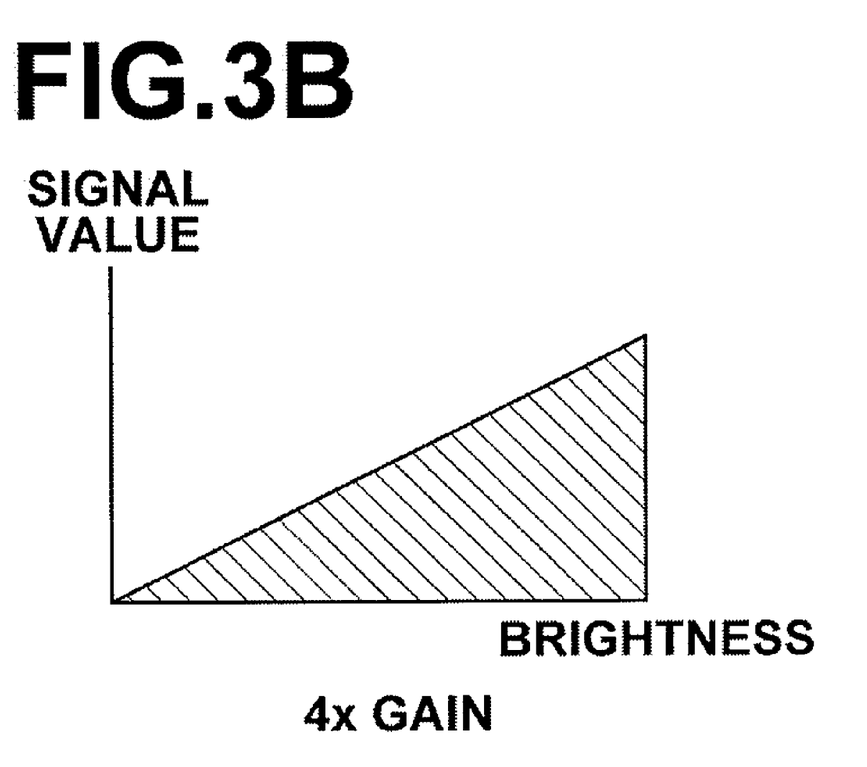
Figure 4A:
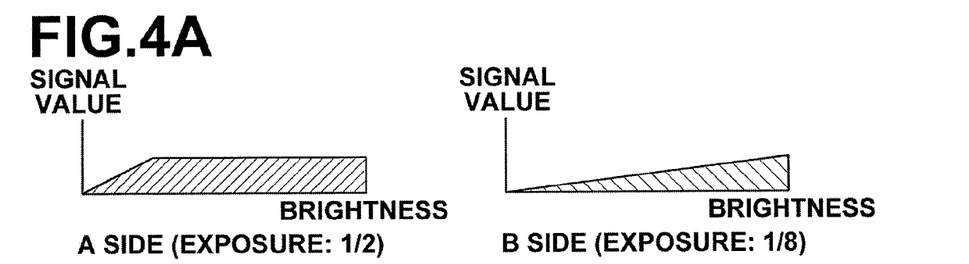
FIGS. 4A, 4B, and 4C are diagrams for explaining how data is processed according to a third photography method.
Figure 4B:
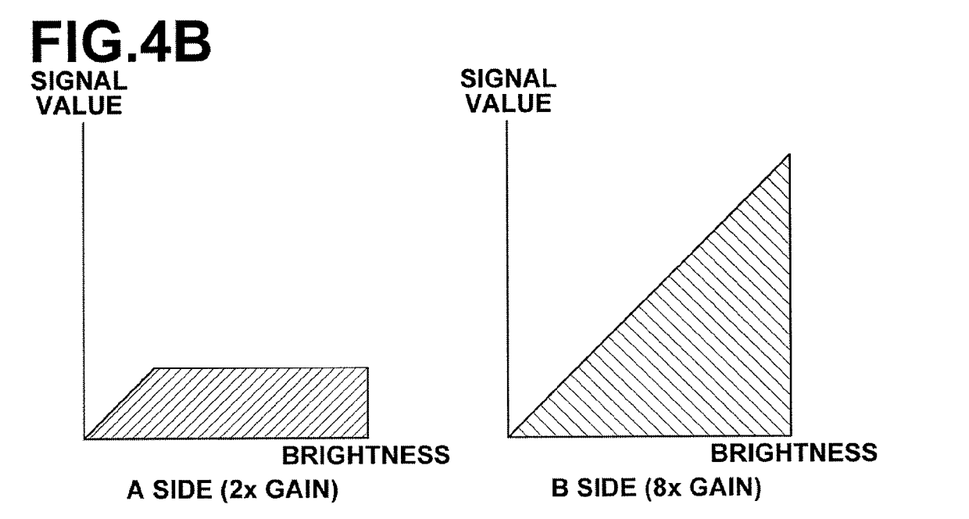
Figure 4C:
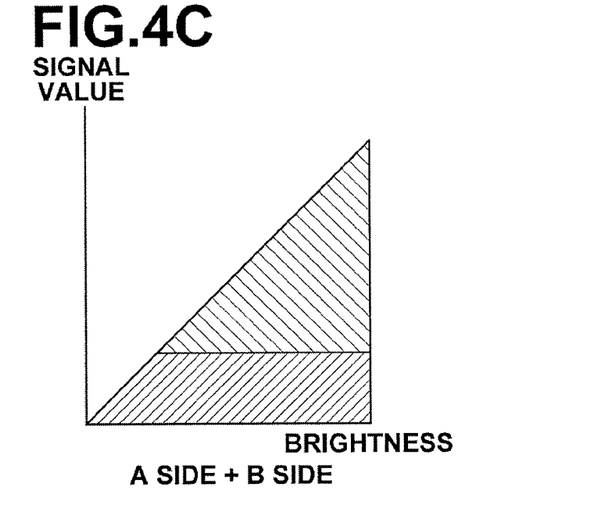
Figure 5:
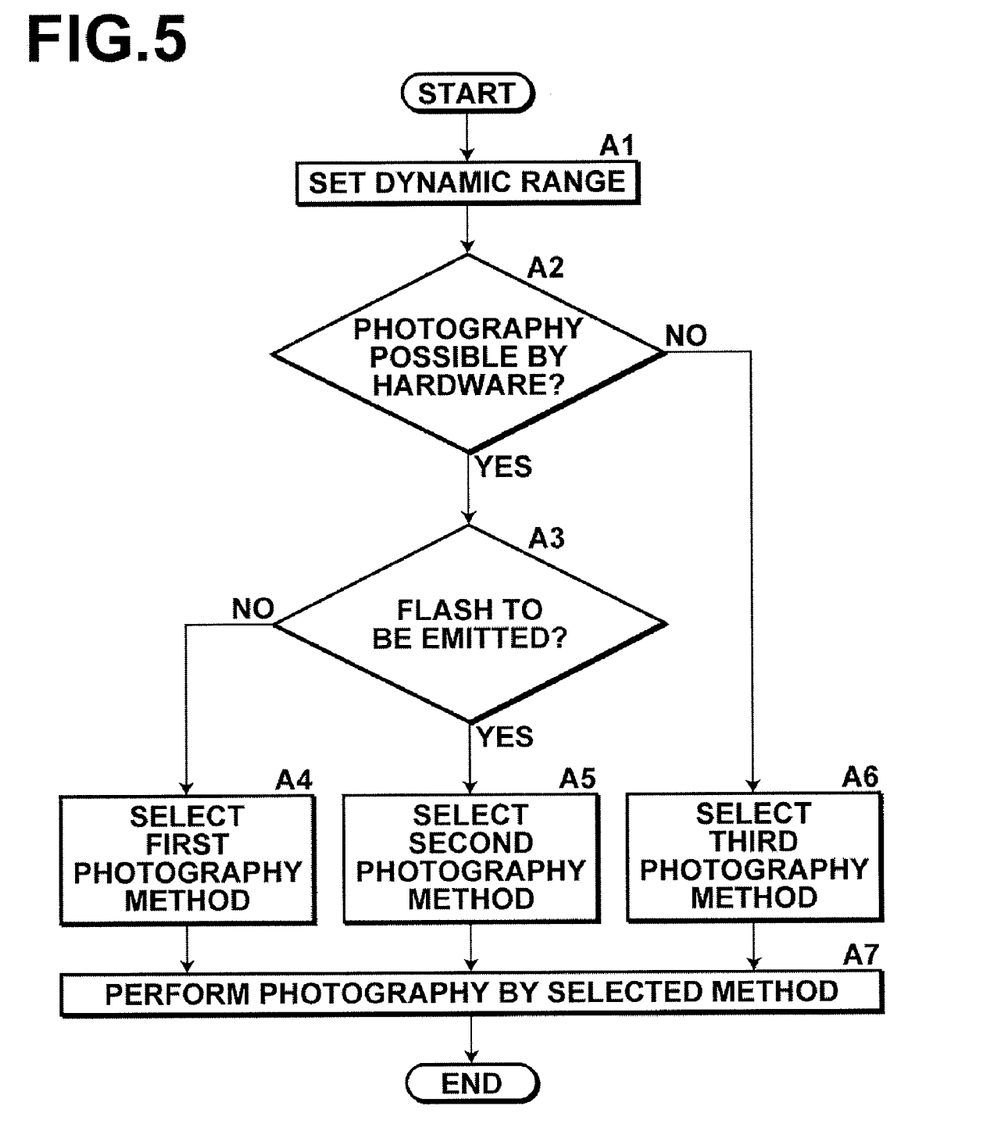
FIG. 5 is a flow chart that illustrates a method by which the digital camera of the first embodiment selects a photography method.

Next, the procedures by which the digital camera 1 having the construction described above performs a plurality of photography operations with different photography conditions to obtain a plurality of image data sets corresponding to each photography operation, and obtains a single dynamic range expanded image data set by processing the plurality of image data sets will be described. FIGS. 2A, 2B, and 2C are diagrams for explaining how data is processed according to a first photography method, FIGS. 3A and 3B are diagrams for explaining how data is processed according to a second photography method, and FIGS. 4A, 4B, and 4C are diagrams for explaining how data is processed according to a third photography method. FIG. 5 is a flow chart that illustrates a method by which the digital camera 1 of the first embodiment selects a photography method.

According to the first embodiment, there are three photography methods by which a plurality of image data sets are obtained by a plurality of photography operations each having different photography conditions and the image data sets are processed to obtain a single dynamic range expanded image data set. First, the photography methods will be described.

In the first photography method, the imaging section 11 performs at least two photography operations with different exposures and the image data processing section 12 processes the image data sets obtained by the photography operations to obtain a single dynamic range expanded image data set. The first photography method is employed in the case that the imaging section 11 is capable of performing photography at exposure ratios which are necessary to obtain a desired dynamic range, and flash is not to be emitted.

First, exposure ratios which are necessary to obtain a desired dynamic range are determined by the image data processing section 12. Then, two image data sets, consisting of an A side image data set, mainly for obtaining data toward the low brightness side, and a B side image data set with a smaller amount of exposure than the A side image data set, mainly for obtaining data toward the high brightness side, are obtained. For example, in the case that the dynamic range is to be expanded by four times, and the exposure of the A side image data set which is photographed with a standard amount of exposure is designated as 1, the exposure of the B side image data set becomes ¼, as illustrated in FIG. 2A. Next, gain correction is performed with respect to the B side image data set at 4 times, in order to cause the slope properties of the A side image data set and the B side image data set to match, as illustrated in FIG. 3B. By combining the data of the A side image data set and the B side image data set such that data of the A side image data set is used as the low brightness side data and data of the B side image data set is used as the high brightness side data, a single dynamic range expanded image data set can be obtained, as illustrated in FIG. 2C.

In the second photography method, the imaging section 11 performs a photography operation with an underexposure at a step number based on the value of the dynamic range set by the dynamic range setting means and the image data processing section 12 processes the image data set obtained by the photography operation to obtain a single dynamic range expanded image data set. The second photography method is employed in the case that the imaging section 11 is capable of performing photography at exposure ratios which are necessary to obtain a desired dynamic range, and flash is to be emitted.

The reason why the second photography method is employed in this case is because it is difficult to accurately control the amount of emitted flash along with the set exposure ratio when performing a plurality of photography operations as in the first photography method. Therefore, in cases that it is necessary for flash to be emitted, it is preferable to perform a process to expand the dynamic range without performing a plurality of photography operations.

In the second photography method, an image data set is obtained by underexposure such that overexposure does not occur, as illustrated in FIG. 3A. As illustrated in FIG. 3B, the image data processing section 12 administers gain correction on the image data set to a desired dynamic range (4 times in this case), to obtain a single dynamic range expanded image data set, in which the dynamic range has been expanded fourfold.

In the third photography method, the imaging section 11 performs at least two photography operations with different underexposures at step numbers based on the value of the dynamic range set by the dynamic range setting means, and the image data processing section 12 processes the at least two image data sets obtained by the photography operations to obtain a single dynamic range expanded image data set. The third photography method is employed in the case that the imaging section 11 is not capable of performing photography at exposure ratios which are necessary to obtain a desired dynamic range.

In the third photography method, first, exposure ratios which are necessary to obtain a desired dynamic range are determined by the image data processing section 12. Then, two image data sets, consisting of an A side image data set, mainly for obtaining data toward the low brightness side, and a B side image data set with a smaller amount of exposure than the A side image data set, mainly for obtaining data toward the high brightness side, are obtained. However, the imaging section 11 is not capable of performing photography operations at the exposure ratio necessary to obtain the desired dynamic range. Therefore, the lesser amount of exposure of the B side image data set is used as a reference, and a photography operation to obtain the A side image data set is performed by increasing the exposure amount to the upper limit of the imaging section 11. For example, in the case that the dynamic range is to be expanded by eight times, but the possible limit of an exposure ratio capable of being photographed by the imaging section 11 is 1:¼ due to hardware restrictions, the exposure of the B side image data set is set to ⅛ and the exposure of the A side image data set is set to the possible upper limit of ½ using the exposure of ⅛ as a reference, as illustrated in FIG. 4A. Next, gain correction is performed with respect to the A side image data set at two times and the B side image data set at eight times, in order to cause the slope properties of the A side image data set and the B side image data set to match, as illustrated in FIG. 4B. By combining the data of the A side image data set and the B side image data set such that data of the A side image data set is used as the low brightness side data and data of the B side image data set is used as the high brightness side data, a single dynamic range expanded image data set can be obtained, as illustrated in FIG. 4C.

Next, the steps of a process for selecting the photography method during photography will be described with reference to the flow chart of FIG. 5.

When photography is initiated, subject data and subject field data are detected by various sensors of the detecting section 16. The CPU 10 sets how much the dynamic range of the image data set to be ultimately obtained is to be expanded from that of an image data set which is obtained by standard photography (Step A1). Next, the CPU 10 determines the exposure ratios among the plurality of photography operations to be performed by the imaging section based on the set dynamic range, and judges whether photography at the determined exposure ratios is capable of being performed by the imaging section 11 (Step A2).

In the case that it is judged that photography is possible at Step A2, the CPU judges whether flash is to be emitted, based on the subject data and the subject field data detected by the various sensors of the detecting section 16 (step A3).

In the case that it is judged that flash is not to be emitted at Step A3, the aforementioned first photography method is selected (Step A4). In the case that it is judged that flash is to be emitted at Step A3, the aforementioned second photography method is selected (Step A5). In the case that it is judged that photography is not possible at Step A2, the aforementioned third photography method is selected (Step A6).

Photography is performed based on the photography method selected in the manner described above (Step A7), a dynamic range expanded image data set is ultimately obtained, and the process ends.

By adopting the configuration described above, it becomes possible to select a favorable photography method to perform photography regardless of the limitations of hardware specifications and to obtain dynamic range expanded image data sets.

Figure 6:
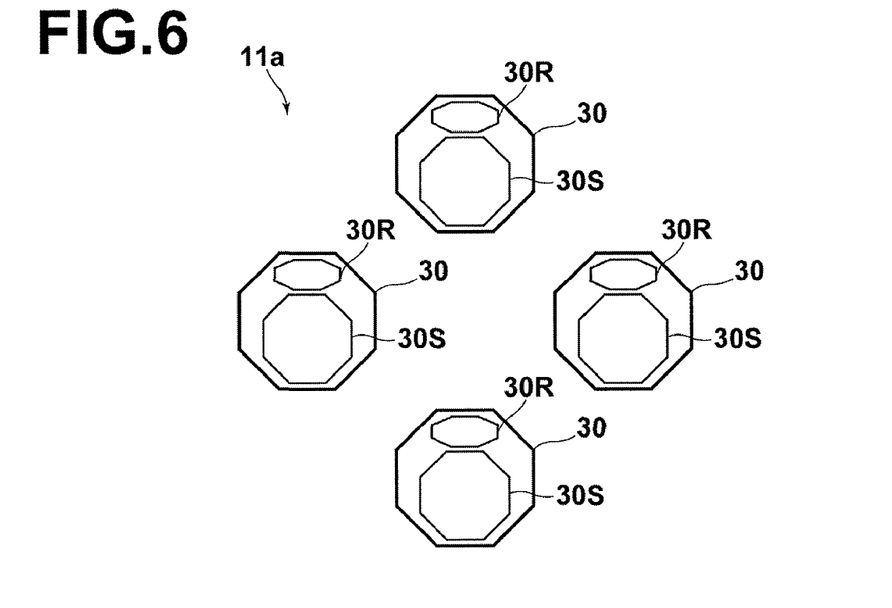
FIG. 6 is a schematic diagram that illustrates the construction of a CCD which is employed in a digital camera according to a second embodiment of the present invention.
Figure 7:
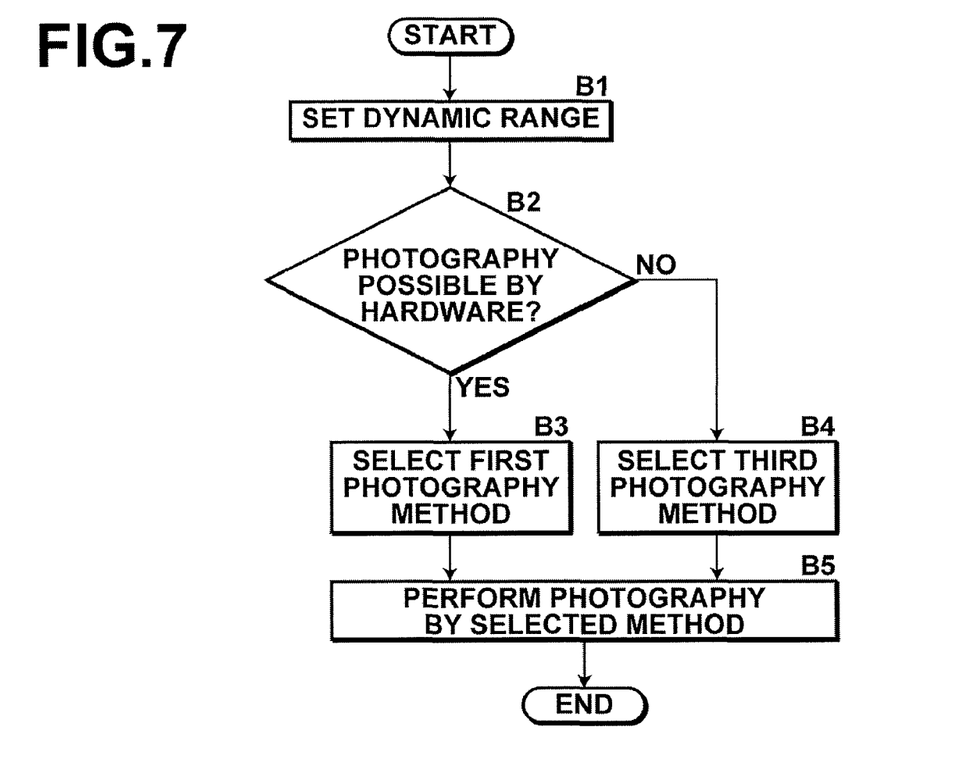
FIG. 7 is a flow chart that illustrates the steps of a method for selecting a photography method employed by the digital cameras of the second and third embodiments of the present invention.

Next, a digital camera to which a photography apparatus according to a second embodiment of the present invention is applied will be described. FIG. 6 is a schematic diagram that illustrates the construction of a CCD which is employed in the digital camera of the second embodiment. FIG. 7 is a flow chart that illustrates a method by which the digital camera of the second embodiment selects a photography method.

The digital camera of the second embodiment differs from the digital camera of the first embodiment in the construction of the imaging section 11 and the method by which a photography method is selected. Specifically, the CCD of the imaging section 11 is constituted by first light receiving elements and second light receiving elements that photoelectrically convert light from subjects, which are capable of being controlled so as to be driven independently from each other and are arranged in a predetermined arrangement in the second embodiment. Note that because the configuration of the digital camera of the second embodiment other than the above points is the same as that of the digital camera of the first embodiment, detailed descriptions other than those related to the above points will be omitted.

The CCD 11*a* of the second embodiment is a light sensor having a great number of light receiving elements which are arranged in a honeycomb structure. As illustrated in FIG. 6, octagonal light receiving elements 30 corresponding to each pixel are arranged in a honeycomb structure. Each light receiving element 30 is constituted by a main pixel 30S having a large light receiving area and a sub pixel 30R having a smaller light receiving area than the main pixel 30S. The main pixels 30S generate greater amounts of signal charges and have higher light receiving sensitivities than the sub pixels 30R due to their larger areas. Therefore, when the same amount of light is received, the main pixels 30S become saturated faster than the sub pixels 30R.

In the case that the CCD 11*a* is employed to obtain a plurality of image data sets to generate a dynamic range expanded image dataset, it is possible to perform a single photography operation with different exposures by the main pixels 30S and the sub pixels 30R. However, the exposure ratio is determined by the ratio between the light receiving sensitivities of the main pixels 30S and the sub pixels 30R. Therefore, photography operations cannot be performed at exposure ratios other than that obtainable by the CCD 11*a*. The second embodiment enables selection of an optimal photography method in the case that such a CCD 11*a* is employed.

The second embodiment employs the aforementioned first and third photography methods.

Next, the steps of a process for selecting the photography method during photography will be described with reference to the flow chart of FIG. 7.

When photography is initiated, subject data and subject field data are detected by various sensors of the detecting section 16. The CPU 10 sets how much the dynamic range of the image data set to be ultimately obtained is to be expanded from that of an image data set which is obtained by standard photography (Step B1). Next, the CPU 10 determines the exposure ratios among the plurality of photography operations to be performed by the imaging section based on the set dynamic range, and judges whether photography at the determined exposure ratios is capable of being performed by the imaging section 11 (Step B2).

In the case that it is judged that photography is possible at Step B2, the aforementioned first photography method is selected (Step B3). In the case that it is judged that photography is not possible at Step B2, the aforementioned third photography method is selected (Step B4).

Photography is performed based on the photography method selected in the manner described above (Step B5), a dynamic range expanded image data set is ultimately obtained, and the process ends.

By adopting the configuration described above, it becomes possible to select a favorable photography method to perform photography regardless of the limitations of hardware specifications and to obtain dynamic range expanded image data sets, as in the first embodiment.

Next, a digital camera to which a photography apparatus according to a third embodiment of the present invention is applied will be described. A flow chart that illustrates a method by which the digital camera of the third embodiment selects a photography method is the same as that illustrated in FIG. 7 and employed by the second embodiment.

The digital camera of the second embodiment differs from the digital camera of the second embodiment in the construction of the imaging section 11. Specifically, the imaging section 11 of the third embodiment changes the shutter speeds of a plurality of photography operations of the same subject to change photography conditions, instead of employing the CCD equipped with the two types of pixels having different sensitivities.

Note that because the configuration of the digital camera of the third embodiment other than the above points is the same as that of the digital camera of the second embodiment, detailed descriptions other than those related to the above points will be omitted.

When obtaining an A side image data set for mainly obtaining data toward the low brightness side and a B side image data set at a lesser amount of exposure than that of the A side image data set, for mainly obtaining data toward the high brightness side, it is necessary to reduce the amount of exposure of the B side image data set accompanying expansion of dynamic range. That is, it is necessary to increase the shutter speed during photography of the B side image data set. However, it is not possible to reduce the amount of exposure to a degree that exceeds the limit of possible shutter speeds. Therefore, there is a limit to the possible expansion rate of the dynamic range. The third embodiment enables selection of an optimal photography method in this case.

The third embodiment employs the aforementioned first and third photography methods.

Next, the steps of a process for selecting the photography method during photography will be described with reference to the flow chart of FIG. 7.

When photography is initiated, subject data and subject field data are detected by various sensors of the detecting section 16. The CPU 10 sets how much the dynamic range of the image data set to be ultimately obtained is to be expanded from that of an image data set which is obtained by standard photography (Step B1). Next, the CPU 10 determines the exposure ratios among the plurality of photography operations to be performed by the imaging section based on the set dynamic range, and judges whether photography at the determined exposure ratios is capable of being performed by the imaging section 11 (Step B2).

In the case that it is judged that photography is possible at Step B2, the aforementioned first photography method is selected (Step B3). In the case that it is judged that photography is not possible at Step B2, the aforementioned third photography method is selected (Step B4).

Photography is performed based on the photography method selected in the manner described above (Step B5), a dynamic range expanded image data set is ultimately obtained, and the process ends.

By adopting the configuration described above, it becomes possible to select a favorable photography method to perform photography regardless of the limitations of hardware specifications and to obtain dynamic range expanded image data sets, as in the first embodiment.

What is claimed is:

1. A photography apparatus, comprising:
   imaging means for performing a plurality of photography operations having different photography conditions for a single subject, and obtaining a plurality of image data sets corresponding to the plurality of photography operations;
   image data processing means, for processing at least one set of image data from among the plurality of sets of image data to obtain a dynamic range expanded image data set;
   dynamic range setting means, for setting the dynamic range of the dynamic range expanded image data set;
   photography method selecting means, for selecting a photography method from among a plurality of photography methods, in which the operations of the imaging means and the image data processing means are defined, most suited for obtaining a dynamic range expanded image data set at the dynamic range set by the dynamic range setting means; and
   photography means, for performing photography operations according to the photography method selected by the photography method selecting means
   wherein the plurality of photography methods include at least:
   a first photography method, in which the imaging means performs at least two photography operations with different exposures and the image data processing means processes the image data sets obtained by the photography operations to obtain a single dynamic range expanded image data set; and
   a third photography method, in which the imaging means performs at least two photography operations with different underexposures at step numbers based on the value of the dynamic range set by the dynamic range setting means and the image data processing means processes the at least two image data sets obtained by the photography operations to obtain a single dynamic range expanded image data set.

2. The photography apparatus as defined in claim 1, further comprising:
   exposure ratio determining means, for determining the exposure ratios among each photography operation based on the dynamic range set by the dynamic range setting means; and
   first judging means for judging whether photography operations employing the exposure ratios determined by the exposure ratio determining means are capable of being performed by the imaging means; and wherein:
   the photography method selecting means selects the photography method suited for obtaining the dynamic range expanded image data set based on the judgment results of the first judging means.

3. The photography apparatus as defined in claim 2, further comprising:
   photometry means, for measuring the photometric values of the subject; and
   second judging means, for judging whether flash is to be emitted toward the subjects, based on the results of measurement of the photometric values by the photometry means;
   wherein the plurality of photography methods include:
   the first photography method;
   a second photography method, in which the imaging means performs a photography operation with an underexposure at a step number based on the value of the dynamic range set by the dynamic range setting means and the image data processing means processes the image data set obtained by the photography operation to obtain a single dynamic range expanded image data set; and
   the third photography method; and wherein:
   the photography method selecting means selects the first photography method in the case that the result of judgment by the first judging means is affirmative and the second judging means judges that flash is not to be emitted, selects the second photography method in the case that the result of judgment by the first judging means is affirmative and the second judging means judges that flash is to be emitted, and selects the third photography method in the case that the result of judgment by the first judging means is negative.

4. The photography apparatus as defined in claim 2, wherein:
   the imaging means is equipped with a great number of first light receiving elements and second light receiving elements that photoelectrically convert light from subjects, which are capable of being controlled so as to be driven independently from each other and are arranged in a predetermined arrangement, and which have different exposure properties that generate exposure differences between the first light receiving elements and the second light receiving elements;
   the plurality of photography methods include: the first photography method; and the third photography method; and
   the photography method selecting means selects the first photography method in the case that the result of judgment by the first judging means is affirmative, and selects the third photography method in the case that the result of judgment by the first judging means is negative.

5. The photography apparatus as defined in claim 2, wherein:
   the imaging means is capable of performing photography operations with different shutter speeds for each of the photography operations, to generate exposure differences for each photography operation;
   the plurality of photography methods include: the first photography method; and a third photography method; and
   the photography method selecting means selects the first photography method in the case that the result of judgment by the first judging means is affirmative, and selects the third photography method in the case that the result of judgment by the first judging means is negative.

6. A photography method, comprising the steps of:
   employing an imaging means to perform a plurality of photography operations having different photography conditions for a single subject, and obtaining a plurality of image data sets corresponding to the plurality of photography operations;
   processing at least one set of image data from among the obtained plurality of sets of image data to obtain a dynamic range expanded image data set;

setting the dynamic range of the dynamic range expanded image data set;

selecting a photography method from among a plurality of photography methods, in which the operations of the imaging means and the image data processing means are defined, most suited for obtaining a dynamic range expanded image data set at the set dynamic range; and performing a photography operation according to the selected photography method, wherein the plurality of photography methods include at least:

a first photography method, in which the imaging means performs at least two photography operations with different exposures and the image data sets obtained by the photography operations are processed to obtain a single dynamic range expanded image data set; and a third photography method, in which the imaging means performs at least two photography operations with different underexposures at step numbers based on the set value of the dynamic range and the at least two image data sets obtained by the photography operations are processed to obtain a single dynamic range expanded image data set.

7. The photography method as defined in claim 6, further comprising the step of:

determining the exposure ratios among each photography operation based on the set dynamic range; and judging whether photography operations employing the determined exposure ratios are capable of being performed by the imaging means; and wherein:

the photography method suited for obtaining the dynamic range expanded image data set is selected based on the judgment results of the judgment.

8. The photography method as defined in claim 7, wherein the plurality of photography methods include:

the first photography method;

a second photography method, in which the imaging means performs a photography operation with an underexposure at a step number based on the value of the dynamic range set by the dynamic range setting means and the image data set obtained by the photography operation is processed to obtain a single dynamic range expanded image data set; and the third photography method; and wherein:

the first photography method is selected in the case that it is judged that the imaging means is capable of performing a photography operation employing the determined exposure ratio and it is judged that flash is not to be emitted, the second photography method is selected in the case that it is judged that the imaging means is capable of performing a photography operation employing the determined exposure ratio and it is judged that flash is to be emitted, and the third photography method is selected in the case that it is judged that the imaging means is not capable of performing a photography operation employing the determined exposure ratio.

9. The photography method as defined in claim 7, wherein:

the imaging means is equipped with a great number of first light receiving elements and second light receiving elements that photoelectrically convert light from subjects, which are capable of being controlled so as to be driven independently from each other and are arranged in a predetermined arrangement, and which have different exposure properties that generate exposure differences between the first light receiving elements and the second light receiving elements;

the plurality of photography methods include: the first photography method; and the third photography method; and the first photography method is selected in the case that it is judged that the imaging means is capable of performing a photography operation employing the determined exposure ratio, and the third photography method is selected in the case that it is judged that the imaging means is not capable of performing a photography operation employing the determined exposure ratio.

10. The photography method as defined in claim 7, wherein:

the imaging means is capable of performing photography operations with different shutter speeds for each of the photography operations, to generate exposure differences for each photography operation;

the plurality of photography methods include: the first photography method; and the third photography method; and the first photography method is selected in the case that it is judged that the imaging means is capable of performing a photography operation employing the determined exposure ratio, and the third photography method is selected in the case that it is judged that the imaging means is not capable of performing a photography operation employing the determined exposure ratio.

* * * * *